(12) United States Patent
Park et al.

(10) Patent No.: US 11,593,009 B2
(45) Date of Patent: Feb. 28, 2023

(54) STORAGE DEVICE AND OPERATING METHOD THEREOF

(71) Applicant: SK hynix Inc., Gyeonggi-do (KR)

(72) Inventors: Ie Ryung Park, Gyeonggi-do (KR); Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/465,695

(22) Filed: Sep. 2, 2021

(65) Prior Publication Data
US 2022/0300157 A1 Sep. 22, 2022

(30) Foreign Application Priority Data

Mar. 19, 2021 (KR) .................. 10-2021-0036132

(51) Int. Cl.
*G06F 3/06* (2006.01)
(52) U.S. Cl.
CPC ............ *G06F 3/064* (2013.01); *G06F 3/0604* (2013.01); *G06F 3/0631* (2013.01); *G06F 3/0659* (2013.01); *G06F 3/0679* (2013.01)
(58) Field of Classification Search
CPC ...... G06F 3/064; G06F 3/0604; G06F 3/0631; G06F 3/0659; G06F 3/0679
See application file for complete search history.

(56) References Cited

U.S. PATENT DOCUMENTS

| | | | |
|---|---|---|---|
| 8,239,614 B2* | 8/2012 | Asnaashari | G06F 12/0246 711/170 |
| 8,832,507 B2* | 9/2014 | Post | G06F 11/1048 714/718 |
| 2005/0251617 A1* | 11/2005 | Sinclair | G06F 3/0658 711/170 |
| 2019/0179741 A1* | 6/2019 | Liu | G06F 3/0688 |
| 2020/0310967 A1* | 10/2020 | Na | G06F 12/0253 |
| 2020/0341896 A1* | 10/2020 | Song | G06F 12/0253 |

FOREIGN PATENT DOCUMENTS

| | | |
|---|---|---|
| KR | 1020200115831 A | 10/2020 |
| KR | 1020200123912 A | 11/2020 |

* cited by examiner

*Primary Examiner* — Francisco A Grullon
(74) *Attorney, Agent, or Firm* — IP & T Group LLP

(57) ABSTRACT

A memory controller includes: a block manager for allocating a plurality of partial super blocks each including partial blocks in different memory blocks; and an operation controller for controlling a plurality of memory devices to perform, in parallel, a program operation of sequentially storing data in physical pages in each of the partial blocks in a partial super block selected from the plurality of partial super blocks. Each of the plurality of partial super blocks includes partial blocks in memory blocks having different numbers of physical pages having an erase state.

20 Claims, 12 Drawing Sheets

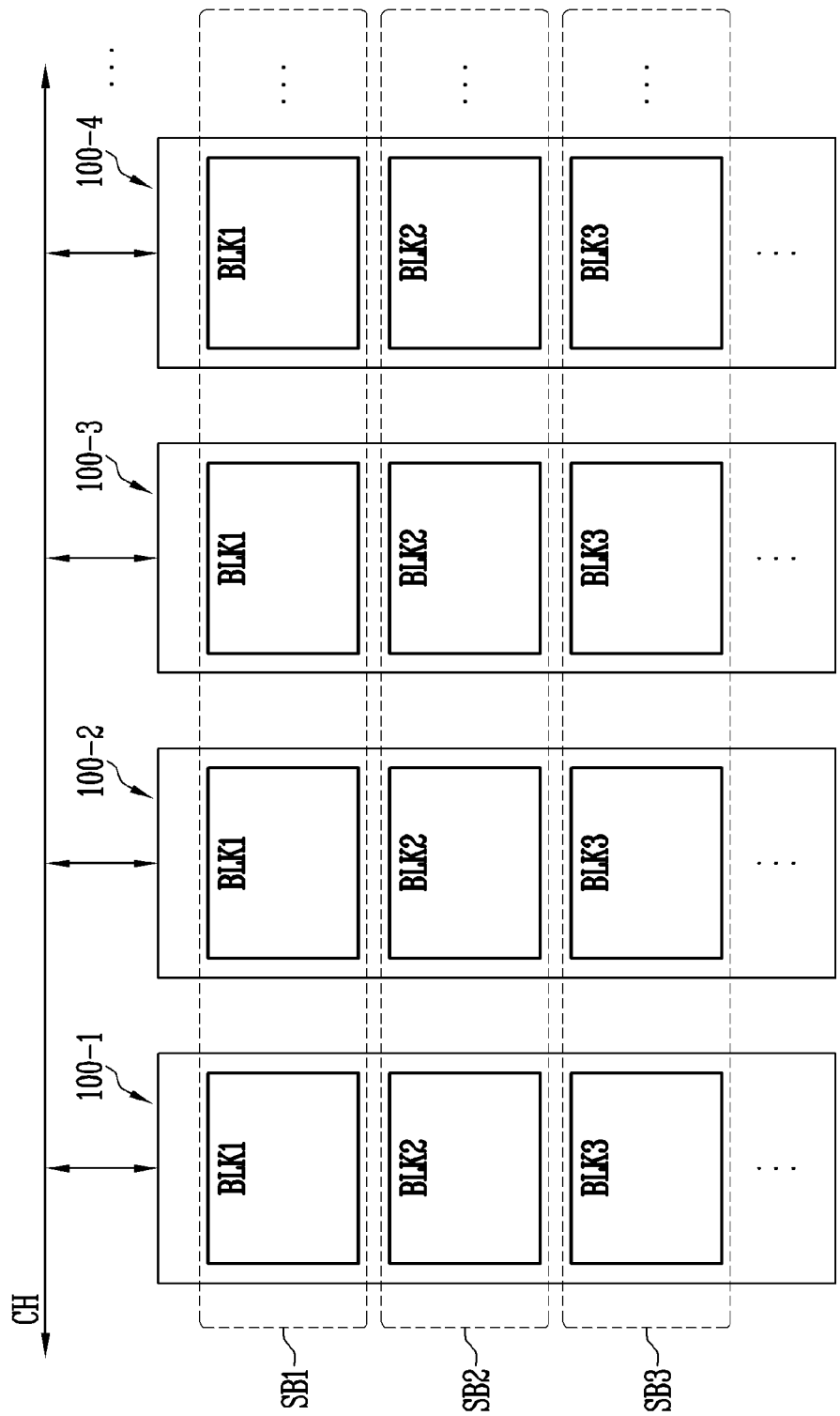

STORAGE DEVICE AND OPERATING METHOD THEREOF

CROSS-REFERENCE TO RELATED APPLICATION

The present application claims priority under 35 U.S.C. § 119(a) to Korean patent application number 10-2021-0036132 filed on Mar. 19, 2021, the entire disclosure of which is incorporated by reference herein.

BACKGROUND

Field of Invention

The present disclosure generally relates to an electronic device, and more particularly, to a storage device and an operating method thereof.

Description of Related Art

A storage device stores data under the control of a host device such as a computer or a smart phone. The storage device may include a memory device for storing data and a memory controller for controlling the memory device. The memory device is generally classified into a volatile memory device and a nonvolatile memory device.

The volatile memory device is a memory device in which data is stored only when power is supplied, and stored data disappears when the supply of power is interrupted. The volatile memory device may include a static random access memory (SRAM), a dynamic random access memory (DRAM), and the like.

The nonvolatile memory device is a memory device in which data does not disappear even when the supply of power is interrupted. The nonvolatile memory device may include a read only memory (ROM), a programmable ROM (PROM), an electrically programmable ROM (EPROM), an electrically erasable ROM (EEROM), a flash memory, and the like.

SUMMARY

Various embodiments of the present disclosure provide a storage device capable of decreasing current consumption in program and read operations, and an operating method of the storage device.

In accordance with an aspect of the present disclosure, there is provided a memory controller for controlling a plurality of memory devices each including a plurality of memory blocks, wherein each of the plurality of memory blocks includes a plurality of partial blocks, and each of the plurality of partial blocks includes a predetermined number of physical pages among a plurality of physical pages in one memory block, the memory controller including: a block manager configured to allocate a plurality of partial super blocks each including partial blocks in different memory blocks; and an operation controller configured to control the plurality of memory devices to perform, in parallel, a program operation of sequentially storing data in physical pages in each of the partial blocks in a partial super block selected from the plurality of partial super blocks, wherein each of the plurality of partial super blocks includes partial blocks in memory blocks having different numbers of physical pages having an erase state.

In accordance with another aspect of the present disclosure, there is provided a method for operating a memory controller for controlling a plurality of memory devices each including a plurality of memory blocks, wherein each of the plurality of memory blocks includes a plurality of partial blocks, and each of the plurality of partial blocks includes a predetermined number of physical pages among a plurality of physical pages included in one memory block, the method including: allocating a plurality of partial super blocks each including partial blocks in different memory blocks; and controlling the plurality of memory devices to perform, in parallel, a program operation of sequentially storing data in physical pages in each of the partial blocks in a partial super block selected from the plurality of partial super blocks, wherein each of the plurality of partial super blocks includes partial blocks in memory blocks having different numbers of physical pages having an erase state.

In accordance with another aspect of the present disclosure, there is provided a system including a plurality of memory devices, each memory device including a plurality of memory blocks; and a memory controller configured to divide each memory block into a plurality of partial blocks, each partial block including a set number of physical pages among a plurality of physical pages in one memory block; allocate a plurality of partial super blocks including a first partial super block and a second partial super block, each partial super block including one or more partial blocks selected from the plurality of memory devices, the number of partial blocks in the first partial super block being different from that of the second partial super block; and control the plurality of memory devices to sequentially perform a program operation on the plurality of partial super blocks.

BRIEF DESCRIPTION OF THE DRAWINGS

Embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5A is a diagram illustrating a super block in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
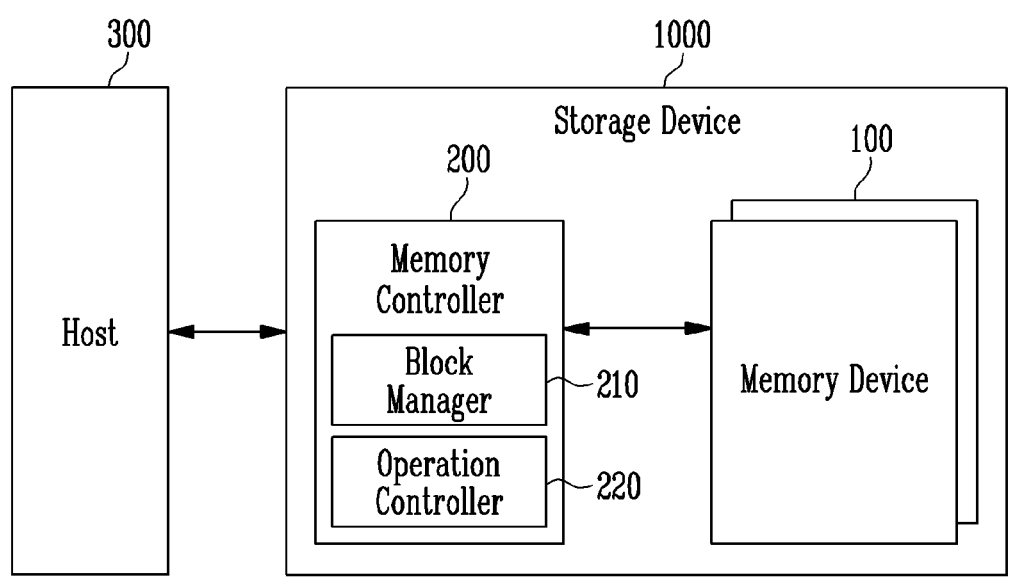
FIG. 1 is a diagram illustrating a storage device in accordance with an embodiment of the present disclosure.

FIG. 1 is a diagram illustrating a storage device in accordance with an embodiment of the present disclosure.

Referring to FIG. 1, the storage device 1000 may include a plurality of memory devices 100 and a memory controller 200. The storage device 1000 may be a memory system.

The storage device 1000 is a semiconductor-based storage device. The storage device 1000 may store data under the control of a host 300. The storage device 1000 may provide the host 300 with the data stored under the control of the host 300.

The storage device 1000 may be configured as one of various types of storage devices according to a host interface that is a communication scheme with the host 300. For example, the storage device 1000 may be configured as any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) type storage device, a Universal Flash Storage (UFS), a Personal Computer Memory Card International Association (PCM-CIA), a Peripheral Component Interconnection (PCI), a PCI-Express (PCI-e or PCIe), a Compact Flash (CF) card, a Smart Media Card (SMC), and a memory stick.

The storage device 1000 may be manufactured as any of various types of package types. For example, the storage device 1000 may be manufactured as any of various types of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

Data may be stored in each of the plurality of memory devices 100. Specifically, each of the plurality of memory devices 100 may include a plurality of memory blocks. That is, one memory device may include a plurality of memory blocks. Each of the plurality of memory blocks may include a plurality of physical pages. That is, one memory block may include a plurality of physical pages. The physical pages may be a unit in which a program operation of storing data is performed. The physical page may be a unit in which a read operation of reading stored data is performed. The memory block may be a unit in which an erase operation of erasing stored data is performed. Each of the plurality of physical pages may include a plurality of memory cells. Data independent from each other may be stored in each of the plurality of memory cells. The data may be a value in a unit of one or more bits. The data may represent various information such as a character, a number, a symbol, an image, and a sound.

Each of the plurality of memory devices 100 may operate under the control of the memory controller 200. When a command is received from the memory controller 200, each of the plurality of memory devices 100 may perform an operation corresponding to the command. The command may be any of a program command, a read command, and an erase command.

In an embodiment, the memory device 100 may be implemented as one of a NAND flash memory, a vertical NAND flash memory, a NOR flash memory, a Static Random Access Memory (RAM) (SRAM), a Dynamic RAM (DRAM), a Synchronous Dynamic RAM (SDRAM), a Double Data Rate (DDR) SDRAM, a Low Power DDR (LPDDR) SDRAM, a Graphics DRAM (GDRAM), a Rambus Dynamic RAM (RDRAM), a Magnetoresistive RAM (MRAM), a Phase Change Memory (PCM), a Spin Transfer Torque Random Access Memory (STT-RAM), a Resistive RAM (ReRAM), and the like. In this specification, by way of example and without any limitation, a case where the memory device 100 is a NAND flash memory is described.

The memory controller 200 may control overall operations of the storage device 1000.

When power is applied to the storage device 1000, the memory controller 200 may execute firmware (FW). The FW may include a host interface layer (HIL) for controlling communication with the host 300, a flash translation layer (FTL) for controlling communication between the host 300 and the plurality of memory devices 100, and a flash interface layer (FIL) for controlling communication with the plurality of memory devices 100. The memory controller 200 may be located at the outside of the plurality of memory devices 100. The memory controller 200 may be connected to the plurality of memory devices 100 through a channel.

The memory controller 200 may control the plurality of memory devices 100.

In an embodiment, the memory controller 200 may control at least one memory device among the plurality of memory devices 100 according to a request received from the host 300. In another embodiment, the memory controller 200 may autonomously control at least one memory device among the plurality of memory devices 100, regardless of any request of the host 300.

The memory controller 200 may control at least one memory device among the plurality of memory devices 100 to perform at least one of a program operation, a read operation, and an erase operation.

In the program operation, the memory controller 200 may provide a program command, an address, and data to at least one memory device among the plurality of memory devices 100. In response thereto, the at least one memory device may store the data in a physical page selected by the address.

In the read operation, the memory controller 200 may provide a read command and an address to at least one memory device among the plurality of memory devices 100. In response thereto, the at least one memory device may provide the memory controller 200 or the host 300 with data stored in a physical page selected by the address.

In the erase operation, the memory controller 200 may provide an erase command and an address to at least one memory device among the plurality of memory devices 100. In response thereto, the at least one memory device may erase data stored in a memory block selected by the address.

The host 300 may control the storage device 1000. For example, the host 300 may provide the storage device 1000 with a command instructing the storage device 1000 to store data. In another example, the host 300 may provide the storage device 1000 with a command requesting stored data. In response thereto, the storage device 1000 may provide the host 300 with data stored in the memory device 100. In another example, the host 300 may provide the storage device 1000 with a command instructing the storage device 1000 to delete data stored in the memory device 100. In response thereto, the storage device 1000 may delete data stored in the memory device 100.

The host 300 may communicate with the storage device 1000, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The host 300 may be one of various electronic devices such as a mobile phone, a smart phone, an MP3 player, a laptop computer, a desktop computer, a game console, a television (TV), a tablet PC, an in-vehicle infotainment system, and a wearable device.

The memory controller 200 may allocate a partial block selected in each of the plurality of memory devices 100 to a partial super block.

Specifically, the memory controller 200 may include a block manager 210 and an operation controller 220.

The block manager 210 may allocate a plurality of partial super blocks respectively including partial blocks included in different memory devices among a plurality of partial blocks. The partial super blocks may respectively include partial blocks included in memory blocks having different numbers of physical pages in an erase state. For example, the partial super block may include a second partial block in a first memory block of a first memory device, and include a first partial block in a first memory block of a second memory device. In an example, a number of physical pages in the erase state may be 8 in the first memory block of the first memory device, in which the second partial block is included, and a number of physical pages in the erase state may be 16 in the first memory block of the second memory device, in which the first partial block is included.

The partial block represents a logical unit obtained by dividing a memory block. That is, each memory block may include a plurality of partial blocks. The partial block may include some physical pages among a plurality of physical pages, which are included in one memory block to which the partial block belongs. The partial block may include a predetermined number of physical pages among a plurality of physical pages, which are included in one memory block. The predetermined number may be a number obtained by dividing n into the number of a plurality of physical pages which are included in one memory block. Here, n may be a natural number of 2 or more.

The partial super block may include an allocated partial block. The partial super block may represent a group of partial blocks selected one by one in each of the plurality of memory devices 100. That is, the partial blocks of the partial super block may be partial blocks selected from different memory devices. The partial super block may represent which memory device among the plurality of memory devices 100 is to perform a program operation or read operation on one partial block and on which partial block the memory device is to perform the program operation or read operation. The partial super block may represent a logical operation unit in which one or more memory devices perform, in parallel, a program operation or a read operation. The operation controller 220 may control the plurality of memory devices 100 to store data in a selected partial super block among a plurality of partial super blocks. Specifically, the operation controller 220 may control the plurality of memory devices 100 to perform, in parallel, a program operation of sequentially storing data in physical pages, which are included in each of partial blocks of the selected partial super block among the plurality of partial super blocks. Also, the operation controller 220 may control the plurality of memory devices 100 to perform a read operation on the selected partial super block. Specifically, the operation controller 220 may control the plurality of memory devices 100 to perform, in parallel, a read operation of sequentially reading data stored in physical pages, which are included in each of the partial blocks of the selected partial super block among the plurality of partial super blocks. Accordingly, the plurality of memory devices 100 may perform, in parallel, the program operation or the read operation.

An embodiment in which a program operation is performed through a partial super bock will be described. For example, a first partial block of a first memory device is allocated to a first partial super block, and a second partial block of the first memory device and a first partial block of a second memory device are allocated to a second partial super block as a next order of the first partial super block. Also, each memory block includes 16 physical pages including first to sixteenth physical pages. Before the program operation is performed, the physical pages may be erased pages, i.e., physical pages are in the erase state. The first partial block may include 8 physical pages including the first to eighth physical pages, and the second partial block may include 8 physical pages including the ninth to sixteenth physical pages. However, this is merely an example, and the number of partial blocks in the memory block and the number of physical pages in the partial block may be variously changed.

The operation controller 220 may control the first and second memory devices to perform a program operation on the first partial super block selected as a first order from the first partial super block and the second partial super block, and to perform a program operation on the second partial super block as a next order of the first partial super block.

First, the program operation on the first partial super block may be performed. Specifically, before the program operation on the first partial super block is performed, a number of erased pages of a memory block to which the first partial block of the first memory device belongs may be 16 as a number of physical pages on which the program operation is not performed. In this state, the first memory device may sequentially program physical pages in the first partial block of the memory device. That is, the first memory device may sequentially program the physical pages from the first to eighth physical pages of the memory block in the first partial block. The number of erased pages of the memory block to which the first partial block belongs may be 8 as the number of physical pages on which the program operation is not performed.

In addition, when the program operation on the first partial block is completed, the program operation on the second partial super block as the next order of the first partial block may be performed. Specifically, before the program operation on the second partial super block is performed, a number of erased pages of a memory block to which the second partial block of the first memory device belongs may be 8, and a number of erased pages of a memory block to which the first partial block of the second memory device belongs may be 16. In this state, the first memory device may sequentially program physical pages in the second partial block of the first memory device. That is, the first memory device may sequentially program the physical pages from the ninth to sixteenth physical pages of the memory block in the second partial block. In parallel to this, the second memory device may sequentially program physical pages in the first partial block of the second memory device. That is, the second memory device may sequentially program the physical pages from the first to eighth physical pages of the memory block in the first partial block. The number of erased pages of the memory block to which the second partial block of the first memory device belongs may be 0, and the number of erase pages of the memory block to which the first partial block of the second memory device belongs may be 8.

In accordance with the present disclosure, there can be provided a storage device capable of decreasing current consumption in program and read operations, and an operating method of the storage device. Hereinafter, the storage device and the operating method thereof will be described in detail with reference to the accompanying drawings.

Figure 2:
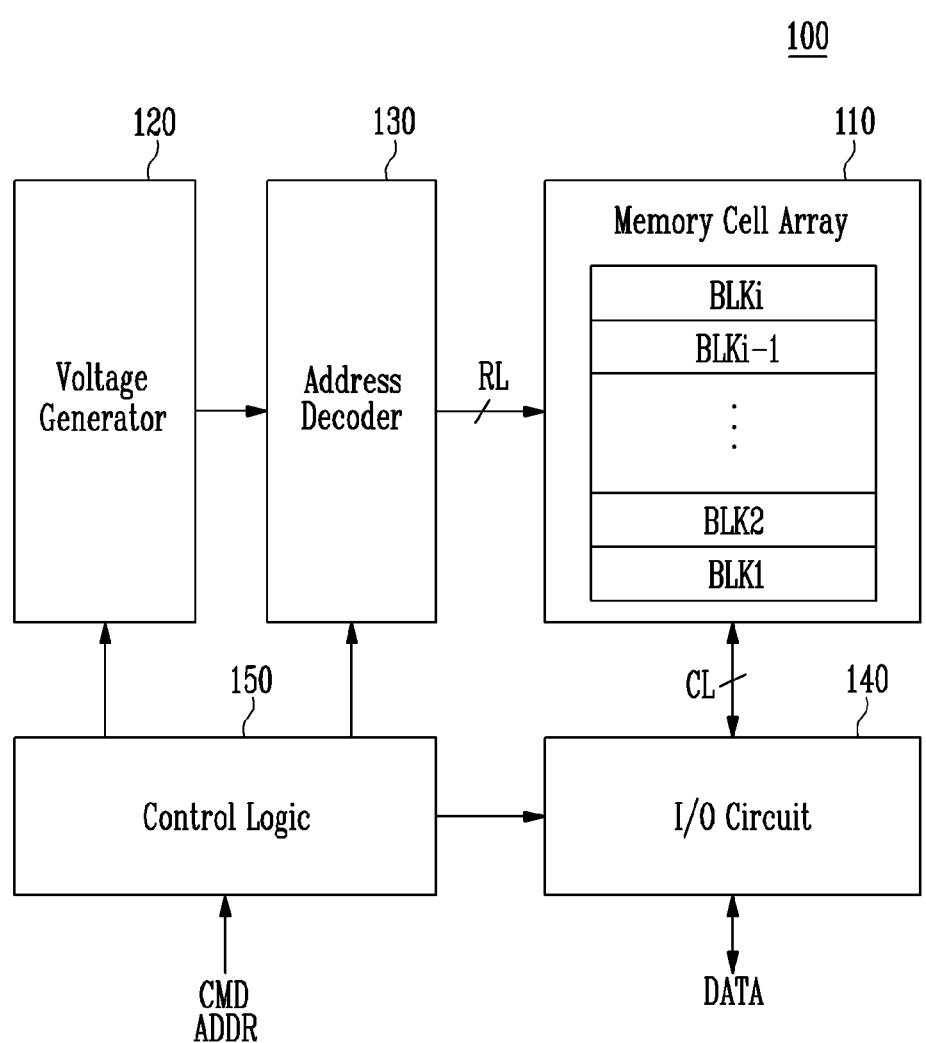
FIG. 2 is a diagram illustrating a structure of a memory device in accordance with an embodiment of the present disclosure.

FIG. 2 is a diagram illustrating a structure of a memory device 100 in accordance with an embodiment of the present disclosure.

Referring to FIG. 2, the memory device 100 may include a memory cell array 110, a voltage generator 120, an address decoder 130, an input/output (I/O) circuit 140, and a control logic 150.

The memory cell array 110 may include a plurality of memory blocks BLK1 to BLKi. The plurality of memory blocks BLK1 to BLKi may be connected to the address decoder 130 through row lines RL. The plurality of memory blocks BLK1 to BLKi may be connected to the I/O circuit 140 through column lines CL. In an embodiment, the row lines RL may include word lines, source select lines, and drain select lines. In an embodiment, the column lines CL may include bit lines.

Each of the plurality of memory blocks BLK1 to BLKi may include a plurality of memory cells.

Data may be stored in each of the plurality of memory cells. For example, each of the plurality of memory cells may store data having a bit number changed according to a Single Level Cell (SLC) scheme capable of store one bit, a Multi-Level Cell (MLC) scheme capable of storing two bits, a Triple Level Cell (TLC) scheme capable of storing three bits, a Quad Level Cell (QLC) scheme capable of storing four bits. Memory cells connected to the same word line among the plurality of memory cells may be defined as a physical page.

In an embodiment, each of the plurality of memory cells may be a nonvolatile memory cell. For example, each of the plurality of memory cells may include a floating gate in which charges can be accumulated. Each of the plurality of memory cells may represent a specific value of data according to a quantity of charges accumulated in the floating gate.

In an embodiment, the voltage generator 120, the address decoder 130, and the I/O circuit 140 may be commonly designated as a peripheral circuit. The peripheral circuit may drive the memory cell array 110 under the control of the control logic 150. The peripheral circuit may drive the memory cell array 110 to perform a program operation, a read operation, and an erase operation.

The voltage generator 120 may generate a plurality of operating voltages by using an external power voltage supplied to the memory device 100. The voltage generator 120 may operate under the control of the control logic 150.

In an embodiment, the voltage generator 120 may generate an internal power voltage by regulating the external power voltage. The internal power voltage generated by the voltage generator 120 may be used as an operating voltage of the memory device 100.

In an embodiment, the voltage generator 120 may generate a plurality of operating voltages by using the external power voltage or the internal power voltage. The voltage generator 120 may generate various voltages required in the memory device 100. For example, the voltage generator 120 may generate a plurality of erase voltages, a plurality of program voltages, a plurality of pass voltages, a plurality of select read voltages, and a plurality of unselect read voltages. To this end, the voltage generator 120 may include a plurality of pumping capacitors which receive the internal power voltage. The voltage generator 120 may generate the plurality of operating voltages by selectively activating the plurality of pumping capacitors under the control of the control logic 150.

The plurality of operating voltages generated by the voltage generator 120 may be supplied to the memory cell array 110 by the address decoder 130.

The address decoder 130 may be connected to the memory cell array 110 through the row lines RL. The address decoder 130 may operate under the control of the control logic 150. The address decoder 130 may receive an address ADDR from the control logic 150. The address decoder 130 may decode a block address in the received address ADDR. The address decoder 130 may select at least one memory block among the memory blocks BLK1 to BLKi according to the decoded block address. The address decoder 130 may decode a row address in the received address ADDR. The address decoder 130 may select at least one word line among word lines of the selected memory block according to the decoded row address. In an embodiment, the address decoder 130 may decode a column address in the received address ADDR. The address decoder 130 may connect the I/O circuit 140 and the memory cell array 110 to each other according to the decoded column address.

In some embodiments, the address decoder 130 may include components such as a row decoder, a column decoder, and an address decoder.

The I/O circuit 140 may include a plurality of page buffers. The plurality of page buffers may be connected to the memory cell array 110 through the bit lines. In a program operation, data stored in the plurality of page buffer may be provided to a selected physical page through the bit lines, and the provided data may be stored in memory cells of the selected physical page. In a read operation, data stored in the memory cells of the selected physical page may be sensed through the bit lines, and the sensed data may be stored in the page buffers.

The control logic 150 may control the address decoder 130, the voltage generator 120, and the I/O circuit 140. The control logic 150 may operate in response to a command CMD transferred from an external device (e.g., the memory controller 200 of FIG. 1). The control logic 150 may control the peripheral circuit by generating control signals in response to the command CMD and the address ADDR.

Figure 3:
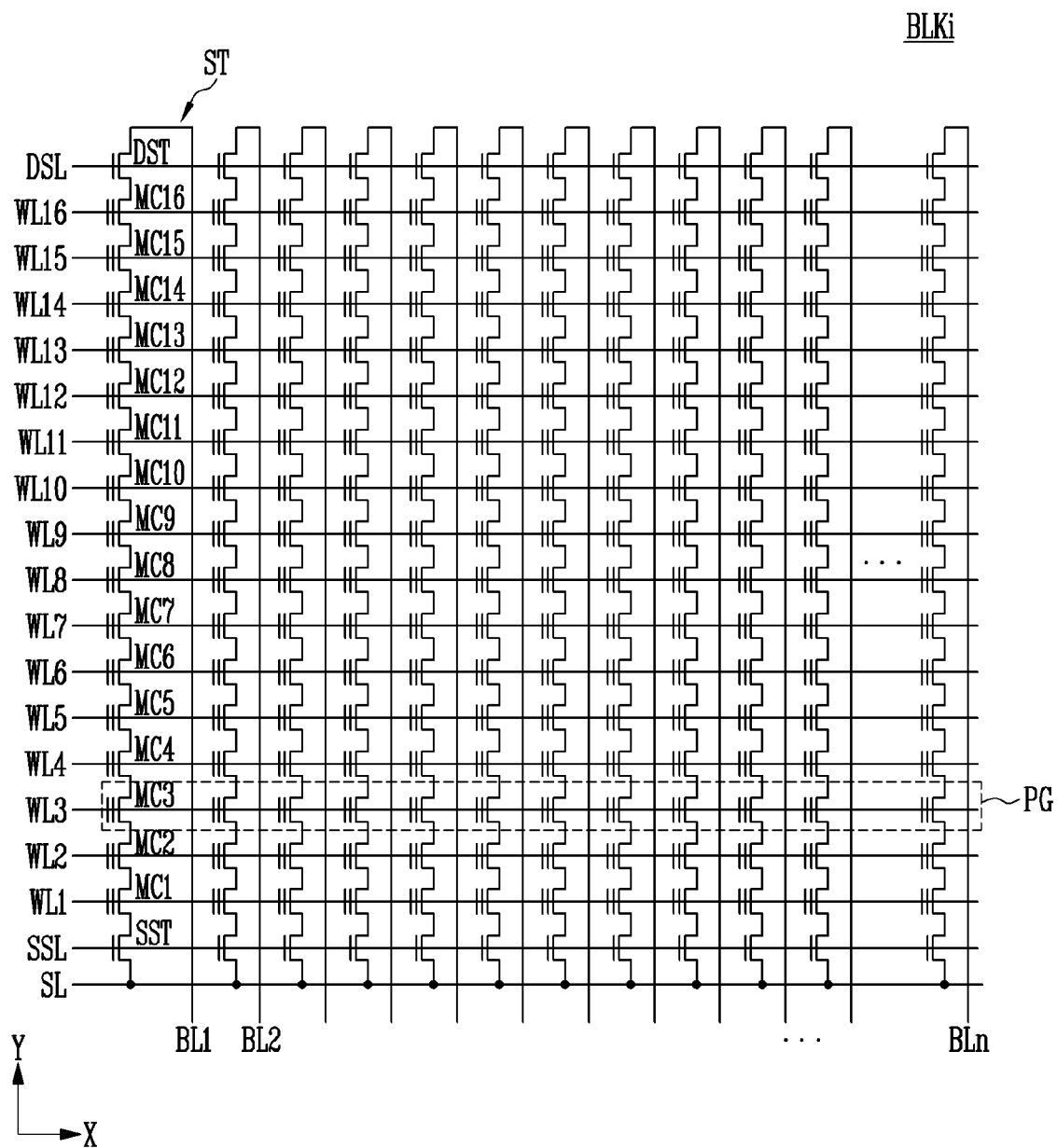
FIG. 3 is a diagram illustrating a structure of a memory block in accordance with an embodiment of the present disclosure.

FIG. 3 is a diagram illustrating a structure of a memory block BLKi in accordance with an embodiment of the present disclosure.

Referring to FIG. 3, the memory block BLKi may include a plurality of strings connected between bit lines BL1 to BLn and a source line SL. Descriptions of the memory block BLKi may be applied to each of the plurality of memory blocks BLK1 to BLKi.

The plurality of strings may be connected one by one to the bit lines BL1 to BLn. The plurality of strings may be commonly connected to the source line SL. The plurality of strings may be configured identically to each other, and therefore, a string ST connected to a first bit line BL1 will be described in detail as an example. Descriptions of the string ST may be equally applied to the other strings.

The string ST may include a source select transistor SST, a plurality of memory cells MC1 to MC16, and a drain select transistor DST, which are connected in series to each other between the source line SL and the first bit line BL1.

The plurality of memory cells MC1 to MC16 may be connected in series between the source select transistor SST and the drain select transistor DST. Gates of the plurality of memory cells MC1 to MC16 may be connected one by one to a plurality of word lines WL1 to WL16. A number of memory cells MC1 to MC16 included in one string ST may be greater than or less than that shown in the drawing.

A drain of the drain select transistor DST may be connected to the first bit line BL1. A gate of the drain select transistor DST may be connected to a drain select line DSL. A source of the source select transistor SST may be connected to the source line SL. A gate of the source select line SST may be connected to a source select line SSL. The number of each of source and drain select transistors SST and DST included in one string ST may be 1 or more.

The plurality of word lines WL1 to WL16, the source select line SSL, and the drain select line DSL may be arranged in parallel to each other. The plurality of word lines WL1 to WL16, the source select line SSL, and the drain select line DSL may be arranged in a direction perpendicular to that in which the strings ST are arranged.

The memory block BLKi may include a plurality of physical pages. The physical page may represent a group of memory cells connected to the same word line. The memory block BLKi may include a number of physical pages equal to that of the plurality of word lines WL1 to WL16. The plurality of physical pages may be configured identically to each other, and therefore, a physical page PG connected to a third word line WL3 among the plurality of physical pages will be described in detail as an example. Descriptions of the physical page PG may be equally applied to the other physical pages.

The physical page PG may include memory cells connected to the third word line WL3 among the plurality of memory cells included in the memory block BLKi. Each of the memory cells included in the physical page PG may be memory cells included in different strings.

In a program operation, the memory device 100 may apply a program voltage to the physical page, to store data in the physical page PG. Specifically, the memory device 100 may apply a program voltage to the third word line WL3. The program voltage applied to the third word line WL3 may be transferred to a gate of each of the memory cells included in the physical page PG connected to the third word line WL3. When the program voltage is applied to the gate of each of the memory cells included in the physical page PG, charges may be injected into a floating gate of each of the memory cells included in the physical page PG through a tunneling phenomenon. A threshold voltage of the memory cell may be changed according to a quantity of the charges accumulated in the floating gate. The threshold voltage may represent a voltage applied to a gate of the memory cell when a channel through which a current can flow between a source and a drain of the memory cell is formed.

The program operation may use an Incremental Step Pulse Program (ISPP) method. The ISPP method may include a plurality of program loops. Each of the plurality of program loops may include a PGM pulse step of applying a program voltage having a predetermined level to a word line and a verify step of identifying pass or fail of the corresponding program loop by applying a verify voltage having a predetermined level to the word line.

In a read operation, the memory device 100 may apply a read voltage to the physical page PG, to output data stored in the physical page PG. Specifically, the memory device 100 may apply a read voltage to the third word line WL3. The read voltage applied to the third word line WL3 may be transferred to the gate of each of the memory cells included in the physical page PG connected to the third word line WL3. In any memory cell included in the physical page PG, when a read voltage applied to a gate of the corresponding memory cell is greater than a threshold voltage of the corresponding memory cell, current may flow through a bit line connected to the corresponding memory cell. When the read voltage applied to the gate of the corresponding memory cell is less than the threshold voltage of the corresponding memory cell, the current may not flow through the bit line connected to the corresponding memory cell. The memory cells may sense whether current flows through the bit lines connected one by one thereto, thereby outputting data which can be differently distinguished from each other according to a magnitude of the read voltage and a sensing result.

Figure 4:
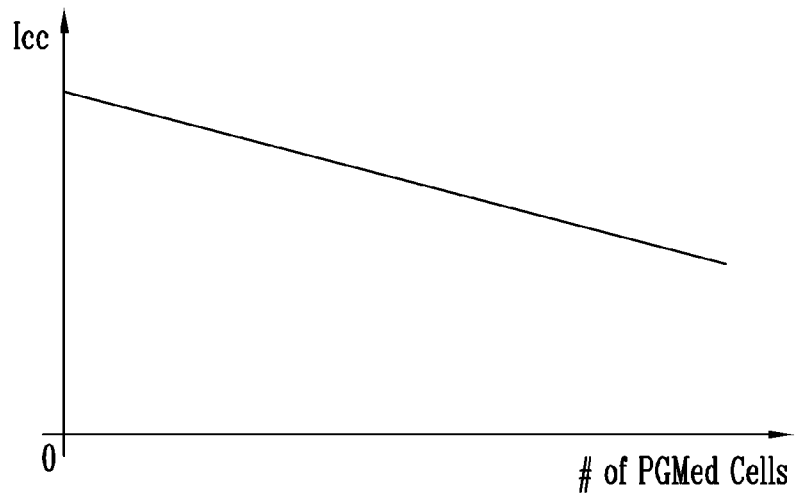
FIG. 4 is a diagram illustrating a consumption current in accordance with an embodiment of the present disclosure.

FIG. 4 is a diagram illustrating a consumption current of memory cells in accordance with an embodiment of the present disclosure.

Referring to FIG. 4, the x-axis of a graph represents the number (#) of memory cells (i.e., PGMed Cells) on which a program operation is performed among the plurality of memory cells included in the memory block BLKi. The y-axis of the graph represents consumption current Icc of a memory cell required in a program operation or read operation. The consumption current Icc may correspond to a program voltage or read voltage required in the program operation or read operation.

The graph shown in FIG. 4 represents that the consumption current Icc required in the program operation or read operation decreases due to a Background Pattern Dependency (BPD) effect, as the program operation on one memory block BLKi progresses.

The BPD effect represents that threshold voltages of one or more adjacent memory cells are influenced according to a quantity of charges accumulated in a particular memory cell. According to the BPD effect, the consumption current ICC may increase as a number of memory cells in an erase state or erased pages in the same memory block BLKi becomes larger.

As described above, when a number of physical pages on which the program operation is performed among the plurality of physical pages in the memory block BLKi increases, the program voltage or read voltage required to perform the program operation or read operation may decrease. That is, when the number of erased pages among the plurality of physical pages in the memory block BLKi decreases, the program voltage or read voltage required to perform the program operation or read operation may decrease.

FIG. 5A is a diagram illustrating a super block in accordance with an embodiment of the present disclosure.

Referring to FIG. 5A, the plurality of memory devices 100 include first to fourth memory devices 100-1 to 100-4, and each of the first to fourth memory devices 100-1 to 100-4 includes first to third memory blocks BLK1 to BLK3.

The memory controller 200 may allocate memory blocks BLK1 to BLK3 respectively selected from the first to fourth memory devices 100-1 to 100-4 to a plurality of super blocks SB1 to SB3. The super bock may represent one group obtained by binding physical memory blocks respectively selected from different memory blocks. As shown in FIG. 5A, the plurality of super blocks SB1 to SB3 include first to third super blocks SB1 to SB3.

Specifically, the memory controller 200 may allocate the first super block SB1 to include first memory blocks BLK1 respectively selected from the first to fourth memory devices 100-1 to 100-4. The memory controller 200 may allocate the second super block SB2 to include second memory blocks BLK2 respectively selected from the first to fourth memory devices 100-1 to 100-4. The memory controller 200 may allocate the third super block SB3 to include third memory blocks BLK3 respectively selected from the first to fourth memory devices 100-1 to 100-4.

The first super block SB1 is described as an example. The first super block SB1 may include a first memory block BLK1 of the first memory device 100-1, a first memory block BLK1 of the second memory device 100-2, a first memory block BLK1 of the third memory block 100-3, and a first memory block BLK1 of the fourth memory block 100-4. That is, the first super block SB1 may include first memory blocks BLK1 of the first to fourth memory devices 100-1 to 100-4, which are bound in an order of the same word line or the same physical page.

Also, the memory controller 200 may control the plurality of memory devices 100-1 to 100-4 to perform a program operation of storing data in the plurality of super blocks SB1 to SB3. The memory controller 200 may control the plurality of memory devices 100-1 to 100-4 to store data in the order of the first super block SB1, the second super block SB2, and the third super block SB3.

First, the memory controller 200 may control the first to fourth memory devices 100-1 to 100-4 to store data in the first super block SB1. In response thereto, the first memory device 100-1 may sequentially apply a program voltage to a plurality of physical pages in the first memory block BLK1. At the same time, each of the second to fourth memory devices 100-2 to 100-4 may sequentially apply the program voltage to a plurality of physical pages in the first memory block BLK1 thereof. That is, the first to fourth memory devices 100-1 to 1004 may perform, in parallel, the program operation on the first memory blocks BLK1 thereof.

Subsequently, in a manner similar to that described above, the memory controller 200 may control the plurality of memory devices 100-1 to 100-4 to store data in the second super block SB2. Also, the memory controller 200 may control the plurality of memory devices 100-1 to 100-4 to store data in the third super block SB3.

As described above, each of the first to fourth memory devices 100-1 to 100-4 may perform the program operation according to the order of the same word line or the same physical page. Accordingly, each of the first to fourth memory devices 100-1 to 100-4 may include the same number of erased pages, regardless of the degree of progression of the program operation. That is, the first to fourth memory devices 100-1 to 100-4 have the same number of cells in the erase state. A consumption current according to the program operation is described in detail with reference to FIG. 5B.

Figure 5B:
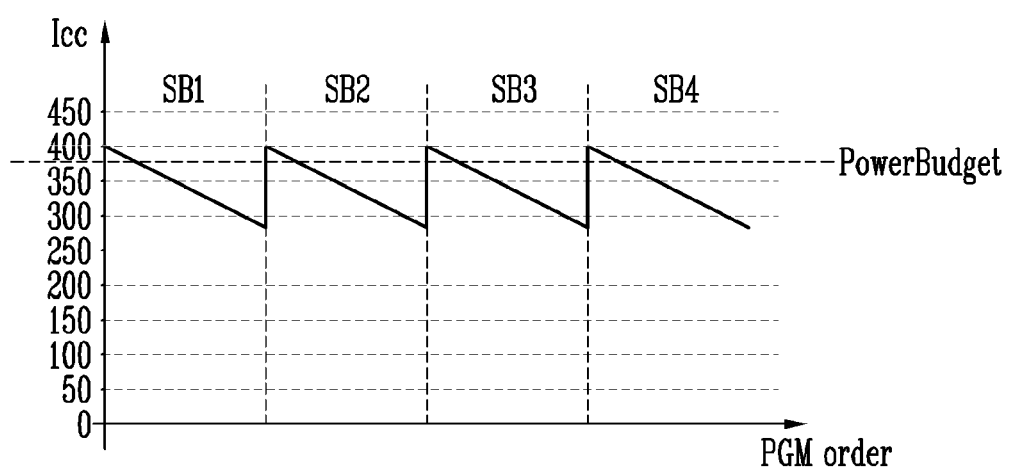
FIG. 5B is a diagram illustrating a consumption current according to a program operation using the super block shown in FIG. 5A in accordance with an embodiment of the present disclosure.

FIG. 5B is a diagram illustrating a consumption current according to the program operation using the super block shown in FIG. 5A in accordance with an embodiment of the present disclosure.

Referring to FIG. 5B, the x-axis of a graph represents that the first to fourth memory devices 100-1 to 100-4 perform the program operation in the order of the first super block SB1, the second super block SB2, and the third super block SB3 (i.e., program (PGM) order). The y-axis of the graph represents total consumption current Icc required when the memory devices perform, in parallel, the program operation. That is, the y-axis of the graph represents sum of consumption currents required when the program operation is performed in individual memory devices.

In the graph shown in FIG. 5B, a zone of each of the first super block SB1, the second super block SB2, and the third super block SB3 represents a zone in which the first to fourth memory devices 100-1 to 100-4 perform, in parallel, the program operation on a memory block included in the corresponding super block.

Specifically, in the zone of the first super block SB1, the first to fourth memory devices 100-1 to 100-4 may perform, in parallel, the program operation on the first super block SB1. That is, the first to fourth memory devices 100-1 to 100-4 may perform the program operation on a plurality of physical pages, which are included in each of the first memory blocks BLK1 in the first super block SB1.

Before the program operation is started, the plurality of physical pages in the first memory block BLK1 may all be in an erase state. The physical page in the erase state may be referred to as an erased page. The number of erased pages in the first memory block BLK1 may be largest. Therefore, a consumption current required in the program operation on a memory block in each of the first to fourth memory devices 100-1 to 100-4 may have a maximum value.

For example, before the program operation is started, the number of erased pages in a memory block which becomes a target of the program operation in one memory device may have a maximum number. As an example, a consumption current Icc required in the program operation on the corresponding memory block is 100. When this is applied to four memory devices, i.e., the first to fourth memory devices 100-1 to 100-4, a consumption current Icc required in the program operation on all of the first to fourth memory devices 100-1 to 100-4 may become 400.

In addition, the number of erased pages in a memory block which becomes a target of the program operation in one memory device may gradually decrease as the program operation progresses. Moreover, a consumption current Icc is required in the program operation on the corresponding memory block. When this is applied to four memory devices, i.e., the first to fourth memory devices 100-1 to 100-4, a consumption current Icc required in the program operation on all of the first to fourth memory devices 100-1 to 100-4 may become 280.

When the program operation on the first super block SB1 is completed, the program operation on the second super block SB2 may progress. In the zone of the second super block SB2, the first to fourth memory devices 100-1 to 100-4 may perform the program operation on the second super bock SB2. That is, the first to fourth memory devices 100-1 to 100-4 may perform the program operation on a plurality of physical pages, which are included in the second memory block BLK2 of the second super block SB2.

When the program operation on the second super block SB2 is started, a consumption current Icc required in each of the first to fourth memory devices 100-1 to 100-4 may again increase. This is because a memory block which becomes a target of the program operation has been changed.

For example, the target of the program operation in the zone of the first super block SB1 becomes the first memory block BLK1 in the first super block SB1. As the program operation progresses, the number of erased pages in the first memory block BLK1 gradually decreases, and therefore, the consumption current required in the program operation on the first memory block BLK1 may gradually decrease. The target of the program operation in the zone of the second super block SB2 is changed to the second memory block BLK2 in the second super block SB2. The number of erased pages in the second memory block BLK2 may become largest, and the consumption current Icc required in the program operation on the second memory block BLK2 may increase to the maximum value as before.

As described above, when the program operation on another super block is started after the program operation on one super block is completed, a consumption current required in the program operation may rapidly increase, and therefore, the difference between a maximum value and a minimum value of the required consumption current Icc may increase. In addition, the consumption current Icc required for the program operation may become higher than a power budget (e.g., a case of 380, etc.).

Hereinafter, a storage device and an operating method thereof, which can decrease a consumption current in program and read operations by using a partial super block allocating partial blocks in accordance with an embodiment of the present disclosure are described in detail.

Figure 6:
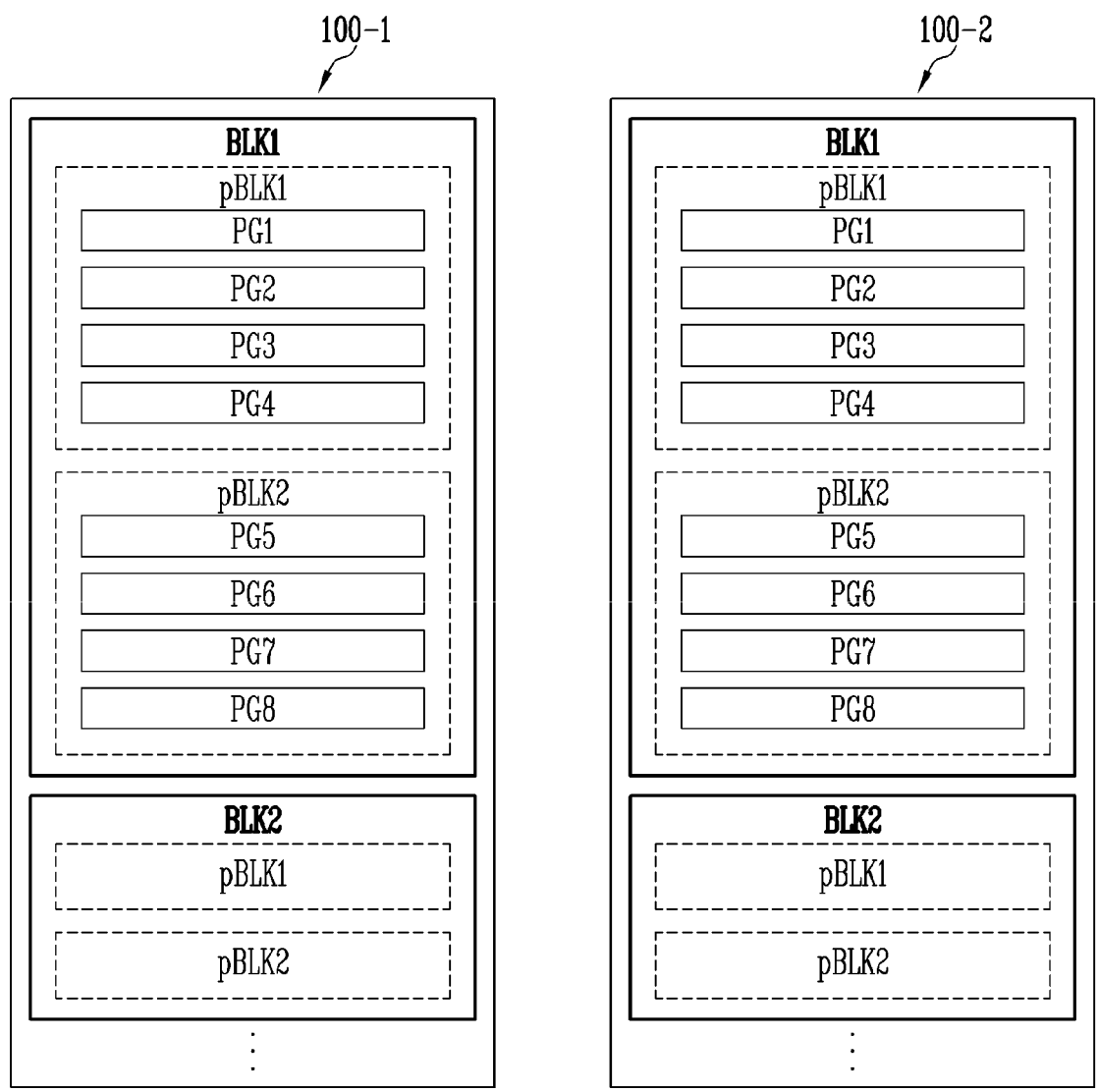
FIG. 6 is a diagram illustrating a partial block in accordance with an embodiment of the present disclosure.

FIG. 6 is a diagram illustrating a partial block in accordance with an embodiment of the present disclosure.

Referring to FIG. 6, the plurality of memory devices 100 include a first memory device 100-1 and a second memory device 100-2.

Each of the first memory device 100-1 and the second memory device 100-2 may include a plurality of memory blocks. That is, each memory device 100-1 or 100-2 may include a plurality of memory blocks. For example, each of the plurality of memory blocks may include a first memory block BLK1 and a second memory block BLK2.

Each of the plurality of memory blocks BLK1 and BLK2 may include a plurality of physical pages. That is, each memory block BLK1 or BLK2 may include a plurality of physical pages. For example, the plurality of physical pages may include first to eighth physical pages PG1 to PG8.

Each of the plurality of memory blocks BLK1 and BLK2 may include a plurality of partial blocks. Each memory block BLK1 or BLK2 may include a plurality of partial blocks. For example, the plurality of partial blocks may include a first partial block pBLK1 and a second partial block pBLK2.

Each of the plurality of partial blocks pBLK1 and pBLK2 may include a predetermined number of physical pages among the plurality of physical pages PG1 to PG8 in one memory block. For example, each of the plurality of partial blocks pBLK1 and pBLK2 may include a first plurality of physical pages PG1 to PG4 or a second plurality of physical pages PG5 to PG8. The first partial block pBLK1 may include the first to fourth physical pages PG1 to PG4. The second partial block pBLK2 may include the fifth to eighth physical pages PG5 to PG8. Each of the plurality of partial blocks pBLK1 and pBLK2 may include the same number of physical pages. That is, each of the plurality of partial blocks pBLK1 and pBLK2 may include a number of physical pages obtained by equally dividing the number of physical pages PG1 to PG8 in one memory block BLK1 or BLK2.

When the program operation is performed on one memory block among the plurality of memory blocks BLK1 and BLK2, a required consumption current Icc may not be influenced by another memory block. For example, a consumption current Icc required for the program operation on the second memory block BLK2 may not be influenced by the number of erased pages in the first memory block BLK1.

When the program operation on one partial block among the plurality of partial blocks pBLK1 and pBLK2 is performed, a required consumption current Icc may be influenced by another partial block in the same memory block. For example, a consumption current Icc required for the program operation on the second partial block pBLK2 in the first memory block BLK1 may be influenced by the number of erased pages, which are included in the first partial block pBLK1 of the first memory block BLK1.

In an embodiment, each of the plurality of partial blocks pBLK1 and pBLK2 may include the same number of physical pages.

In the above, it has been described that each memory block BLK1 or BLK2 includes two partial blocks pBLK1 and pBLK2. However, this is merely an example, and the memory block BLK1 or BLK2 may include k partial blocks. Here, k is a natural number of 2 or more. Hereinafter, by way of example and without any limitation, a case where k is 2 is described. Moreover, the number of physical pages in each memory block BLK1 or BLK2 or the number of physical pages in one partial block pBLK1 and pBLK2 may be changed differently from that shown in the drawing.

Figure 7A:
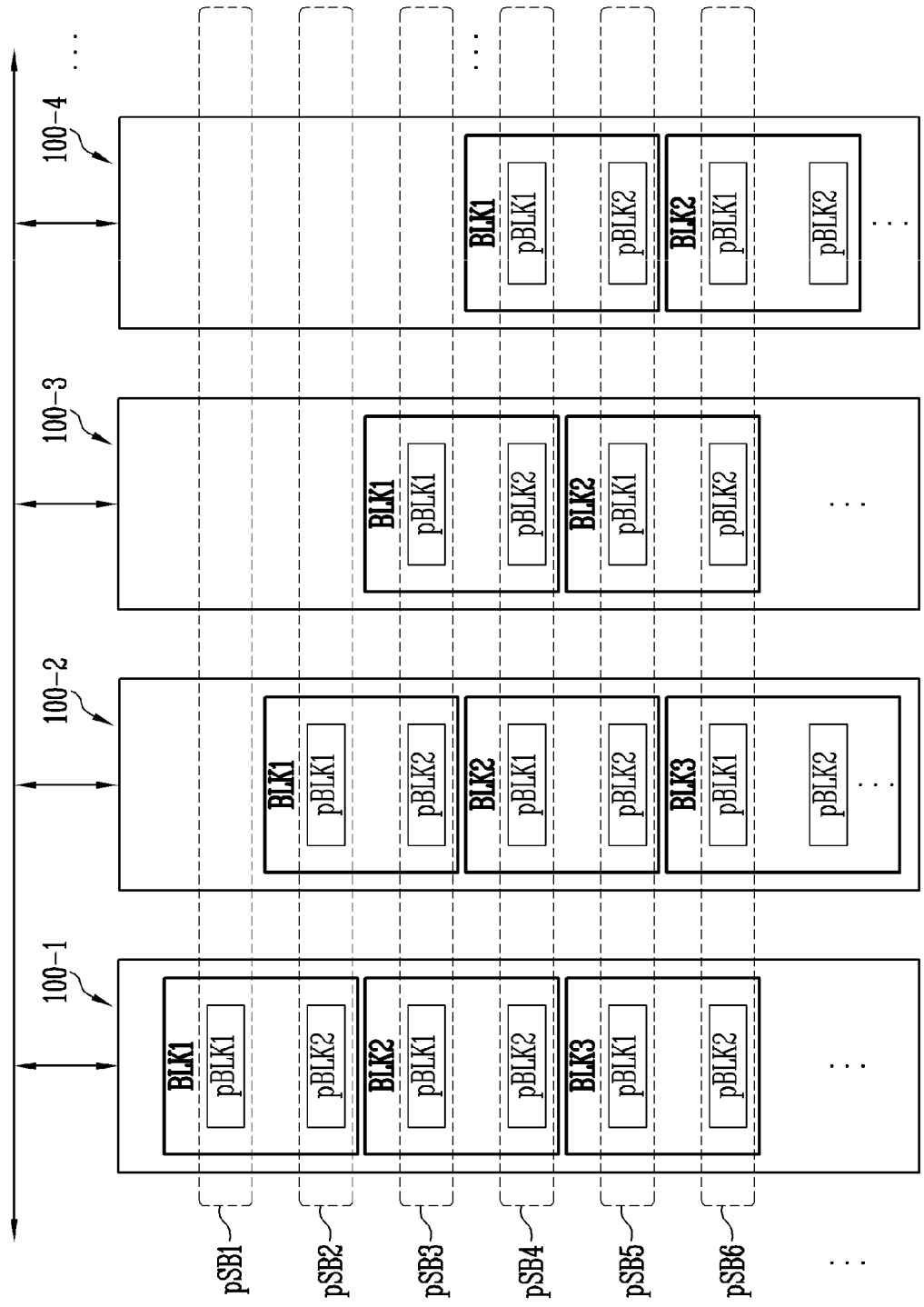
FIG. 7A is a diagram illustrating a partial super block in accordance with an embodiment of the present disclosure.

FIG. 7A is a diagram illustrating a partial super block in accordance with an embodiment of the present disclosure.

Referring to FIGS. 6 and 7, the memory controller 200 may control a plurality of memory devices 100-1 to 100-4. Each of the plurality of memory devices 100-1 to 100-4 may include a plurality of memory blocks BLK1 to BLK3. Each of the plurality of memory blocks BLK1 to BLK3 may include a plurality of partial blocks pBLK1 and pBLK2. Each of the plurality of partial blocks pBLK1 and pBLK2 may include a plurality of physical pages PG1 to PG4 or PG5 to PG8.

For example, the plurality of memory devices 100-1 to 100-4 may include first to fourth memory devices 100-1 to 100-4. Each of the first to fourth memory devices 100-1 to 100-4 may include first to third memory blocks BLK1 to BLK3. Each of the first to third memory blocks BLK1 to BLK3 may include a first partial block pBLK1 and a second partial block pBLK2. The first partial block pBLK1 may include first to fourth physical pages PG1 to PG4, and the second partial block pBLK2 may include fifth to eighth physical pages PG5 to PG8. Each of the first to eighth physical pages PG1 to PG8 may include a plurality of memory cells. The first to eighth physical pages PG1 to PG8 may be respectively connected one by one to eight word lines. However, the above-described embodiment is merely an embodiment, and the numbers of memory devices, memory blocks, partial blocks, and physical pages may be changed.

The memory controller 200 may include a block manager 210 and an operation controller 220 as shown in FIG. 1. The block manager 210 and the operation controller 220 may be implemented with a software module which allows the memory controller 200 to perform a corresponding operation. However, the present disclosure is not limited thereto, and the block manager 210 and the operation controller 220 may also be implemented with a hardware module which autonomously performs the corresponding operation. When each of the block manager 210 and the operation controller 220 is implemented with a hardware module, the block manager 210 and the operation controller 220 may be implemented in the form of one chip or be implemented in the form of individual chips.

The block manager 210 may allocate a plurality of partial super blocks each including partial blocks included in different memory devices. The plurality of partial super blocks may include different numbers of partial blocks. For example, the plurality of partial super blocks may include first to seventh partial super blocks pSB1 to pSB7. The order may be set to each of the plurality of partial super blocks pSB1 to pSB7. The order represents the order of a program operation or read operation. Hereinafter, a case where the program operation is performed in the order of the first to seventh partial super blocks pSB1 to pSB7 is described.

To this end, the block manager 210 may select at least one partial block to be allocated to one partial super block. That is, the number of partial blocks to be allocated to the one partial super block may be 1 or more. When the number of partial blocks to be allocated to the one partial super block is 2 or more, each partial block may be partial blocks of different memory devices.

Specifically, the block manager 210 may select at least one memory device among the plurality of memory devices 100-1 to 100-4 with respect to one partial super block. That is, one or more memory devices may be selected for every one partial super block.

Also, the block manager 210 may select one partial block among the plurality of partial blocks pBLK1 and pBLK2 with respect to one memory device selected with respect to the one partial super block. Specifically, the block manager 210 may select one partial block among the plurality of partial blocks pBLK1 and pBLK2 in the selected memory device. That is, one partial block may be selected for every selected one memory device.

In an embodiment, the block manager 210 may select a partial super block mapped to an index value in a block table and at least one partial block mapped to the partial super block. Specifically, the block manager 210 may select at least one memory device mapped to each of the plurality of partial super blocks pSB1 to pSB7 in the block table, and select a partial block mapped to each selected memory device.

The block table may include an index value mapped to each of the plurality of partial super block pSB1 to pSB7 and information on at least one partial block pBLK1 and pBLK2 mapped to each of the plurality of partial super block pSB1 to pSB7.

The block table may mean a table which pre-defines a mapping relationship between information by columns and rows. For example, each column of the block table may include one column data. Column data located on the same row in the block table may represent a relationship in which the column data are mapped to each other.

Specifically, each column of the block table may include, as column data, one of an index value, a partial super block, a memory device, a memory block, and a partial block. An index value, a partial super block, a memory device, a memory block, and a partial block, which are located on the same row in the block table, may represent a relationship in which the index value, the partial super block, the memory device, the memory block, and the partial block are mapped to each other. The index value may represent the order of the partial super block according to a size thereof.

The block manager 210 may select at least one memory device mapped to each of the plurality of partial super block pSB1 to pSB7 in the block table. For example, the block manager 210 may select at least one memory device mapped to the first partial super block pSB1 in the block table.

Also, the block manager 210 may select one partial block among the plurality of partial blocks pBLK1 and pBLK2, based on the block table, with respect to each of the at least one memory device selected from each of the plurality of partial super block pSB1 to pSB7.

For example, different columns of a first row of the block table may include information on an index value 1, the first partial super block pSB1, the first memory device 100-1, the first memory block BLK1, and the first partial block pBLK1. Different columns of a second row of the block table may include information on an index value 2, the second partial super block pSB2, the first memory device 100-1, the first memory block BLK1, and the second partial block pBLK2. Different columns of a third row of the block table may include information on the index value 2, the second partial super block pSB2, the second memory device 100-2, the first memory block BLK1, and the first partial block pBLK1.

The block manager 210 may select the first partial block pBLK1 of the first memory block BLK1 of the first memory device 100-1 through information on the first memory device 100-1, the first memory block BLK1, and the first partial block pBLK1, which are mapped to the first partial super block pSB1 in the block table.

Also, the block manager 210 may select the second partial block pBLK2 of the first memory block BLK1 of the first memory device 100-1 and the first partial block pBLK1 of the first memory block BLK1 of the second memory device 100-2 through information on the first memory device 100-1, the first memory block BLK1, and the second partial block pBLK2, information on the second memory device 100-2, the first memory block BLK1, and the first partial block pBLK1, which are mapped to the second partial super block pSB2 in the block table.

In an embodiment, a number of partial blocks to one partial super block in the block table may be less than partial blocks mapped to another partial super block to which a larger index value is mapped among the plurality of partial super blocks pSB1 to pSB7. That is, the number of partial blocks in a partial super block may increase as an index value representing the order of an operation of the partial super block.

For example, the number of partial blocks mapped to the first partial super block pSB1 having an index value of 1 in the block table may be 1, and the number of partial blocks mapped to the second partial super block pSB2 having an index value of 2 in the block table may be 2.

In a manner similar to that of the second partial super block pSB2, the block manager 210 may select partial blocks with respect to the third to seventh partial super blocks pSB3 to pSB7.

In an embodiment, the block manager 210 may select a predetermined one memory device or randomly select one memory device among the plurality of memory devices 100-1 to 100-4, with respect to the first partial super block pSB1. For example, the first memory device 100-1 may be selected.

The block manager 210 may select a predetermined partial block or randomly select one partial block among the plurality of partial blocks pBLK1 and pBLK2, with respect to the first partial super block pSB1. For example, the first partial block pBLK1 of the first memory block BLK1 in the first memory device 100-1 may be selected.

Also, the block manager 210 may select a memory device (e.g., the first memory device 100-1) in a partial super block (e.g., the first partial super block pSB1) of a previous order and a memory device (e.g., the second memory device 100-2) adjacent to the selected memory device (e.g., the first memory device 100-1) among the plurality of memory devices 100-1 to 100-4, with respect to the second partial super block pSB2.

The block manager 210 may select a partial block (e.g., the first partial block pBLK1 of the first memory block BLK1) allocated to a partial super block (e.g., the first partial super block pSB1) of the previous order and an adjacent partial block (e.g., the second partial block pBLK2 of the first memory block BLK1) among the plurality of partial blocks pBLK1 and pBLK2 in the memory device (e.g., the first memory device 100-1), which is selected in the partial super block (e.g., the first partial super block pSB1) of the previous order. The selected partial block may be included together with the partial block allocated to the partial super block of the previous order in the same memory block.

Also, the block manager 210 may select the first partial block pBLK1 of a memory block (e.g., the first partial block pBLK1 of the first memory block BLK1) having a position corresponding to the partial block (e.g., the first partial block pBLK1 of the first memory block BLK1) allocated to the partial super block (e.g., the first partial super block pSB1) of the previous order among the plurality of partial blocks pBLK1 and pBLK2 in a newly selected memory device (e.g., the second memory device 100-2). Alternatively, the block manager 210 may select a predetermined one partial block or randomly select one partial block among the plurality of partial blocks pBLK1 and pBLK2 in the newly selected memory device (e.g., the second memory device 100-2). For example, the first partial block pBLK1 of the first memory block BLK1 in the second memory device 100-2 may be selected.

Also, the block manger 210 may select memory devices and partial blocks with respect to the third to seventh partial super blocks pSB3 to pSB7 in a manner similar to that of the second partial super block pSB2.

The block manager 210 may allocate a partial super block including a selected partial block. Specifically, the block manager 210 may allocate a partial super block including each of selected partial blocks of selected memory devices. The partial super block may include a partial block selected in each of at least one selected memory device.

In an embodiment, a partial block in one partial super block may be included together with any partial block among partial bocks in a partial super block of a next order in the same memory block.

For example, the first partial block pBLK1 in the first partial super block pSB1 may be included together with the second partial block pBLK2 in the second partial super block pSB2 in the same first memory block BLK1 of the first memory device 100-1.

In an embodiment, one partial super block may include a partial block located in an upper region of a memory block selected in one memory device among the plurality of memory devices 100-1 to 100-4. In addition, a partial super block of a next order may include a partial block located in a lower region of the memory block selected in the same memory device as the partial super block of the previous order and a partial block located in an upper region of a memory block selected in an adjacent memory device.

For example, the first partial super block pSB1 may include the first partial block pBLK1 located in an upper region of the first memory block BLK1 selected in the first memory device 100-1 among the plurality of memory devices 100-1 to 100-4. The second partial super block pSB2 of a next order may include the second partial block pBLK2 located in a lower region of the first memory block BLK1 selected in the same first memory device 100-1 as the first partial super block pSB1. In addition, the second partial super block pSB2 may include the first partial block pBLK1 located in an upper region of the first memory block BLK selected in the second memory device 100-2 adjacent to the first memory device 100-1 among the plurality of memory devices 100-1 to 100-4.

In an embodiment, the block manager 210 may select partial blocks in different memory devices among partial blocks. Further, the block manager 210 may allocate any partial super block including the selected partial blocks such that a number of physical pages having an erase state, which are included in memory blocks to which the partial blocks in the one partial super block belong, becomes equal to that of physical pages having the erase state, which are included in memory blocks to which the partial blocks in another partial super block belong.

For example, the block manager 210 may select partial blocks in different memory devices among partial blocks. Further, the block manager 210 may allocate the fifth partial super block pSB5 including the selected partial blocks such that a number of physical pages having the erase state, which are included in memory blocks to which the partial blocks in the fifth partial super block pSB5 belong, becomes equal to that of physical pages having the erase state, which are included in memory blocks to which the partial blocks in the fourth partial super block pSB4 belong.

A number of physical pages having the erase state, which are included in a memory block, may be a number of physical pages having the erase state, which is predicted based on a time before the program operation on each partial super block is performed. For example, the number of physical pages having the erase state, which are included in the memory blocks to which the partial blocks included in the fourth partial super block pSB4 belong, may be a number of physical pages having the erase state, which is predicted based on a time before the program operation on the fourth partial super block pSB4 is performed after the program operation on the third partial super block pSB3 is performed. The number of physical pages having the erase state, which are included in the memory blocks to which the partial blocks included in the fifth partial super block pSB5 belong, may be a number of physical pages having the erase state, which is predicted based on a time before the program operation on the fifth partial super block pSB5 is performed after the program operation on the fourth partial super block pSB4 is performed.

Also, the block manger 210 may select partial blocks included in different memory devices among partial blocks. Further, the block manger 210 may allocate the sixth partial super block pSB6 including the selected partial blocks such that a number of physical pages having the erase state, which are included in memory blocks to which the partial blocks in the sixth partial super block pSB6 belong, becomes equal to that of physical pages having the erase state, which are included in the memory blocks to which the partial blocks in the fifth partial super block pSB5 belong.

The operation controller 220 may control the plurality of memory devices 100-1 to 100-4 to store data in a selected partial super block among the plurality of partial super blocks pSB1 to pSB7.

For example, when the first partial super block pSB1 is selected, the operation controller 220 may control the first memory device 100-1 to perform a program operation of sequentially storing data in the first to fourth physical pages PG1 to PG4 in the first partial block pBLK1 of the first memory block BLK1 in the first partial super block pSB1.

The first memory device 100-1 may perform a program operation of storing data in a corresponding page in the order of the first physical page PG1, the second physical page PG2, a third physical page PG3, and a fourth physical page PG4, which are included in the first partial block pBLK1 of the first memory block BLK1.

Next, when the second partial super block pSB2 is selected, the operation controller 220 may control the first memory device 100-1 to perform a program operation of sequentially storing data in the fifth to eighth physical pages PG5 to PG8 in the second partial block pBLK2 of the first memory block BLK1 in the second partial super block pSB2. In parallel thereto, the operation controller 220 may control the second memory device 100-2 to perform a program operation of sequentially storing data in the first to fourth physical pages PG1 to PG4 in the first partial block pBLK1 of the first memory block BLK1 in the second partial super block pSB2.

The first memory device 100-1 may perform a program operation of storing data in the fifth physical page PG5 in the second partial block pBLK2 of the first memory block BLK1. In parallel thereto, the second memory device 100-2 may perform a program operation of storing data in the first physical page PG1 in the first partial block pBLK1 of the first memory block BLK1. Next, the first memory device 100-1 may perform a program operation of storing data in the sixth physical page PG6 in the second partial block pBLK2 of the first memory block BLK1. In parallel thereto, the second memory device 100-2 may perform a program operation of storing data in the second physical page PG2 in the first partial block pBLK1 of the first memory block BLK1. In this manner, the first memory device 100-1 and the second memory device 100-2 may perform, in parallel, a program operation of sequentially storing data in physical pages.

In an embodiment, the operation controller 220 may control the plurality of memory devices 100-1 to 100-4 to store data in a partial super block selected according to a size order of the index value among the plurality of partial super blocks pSB1 to pSB7 allocated based on the block table.

Specifically, the operation controller 220 may determine the order of the plurality of partial super blocks pSB1 to pSB7 according to the size of an index mapped to each of the plurality of partial super blocks pSB1 to pSB7 in the block table. For example, when the index value mapped to the first partial super block pSB1 is 1, and the index value mapped to the second partial super block pSB2 is 2, the operation controller 220 may determine, as a first order, the first partial super block pSB1 having the index value less than that of the second partial super block pSB2, and determine, as a next order, the second partial super block pSB2 having the index value greater than that of the first partial super block pSB1.

The operation controller 220 may control the plurality of memory devices 100-1 to 100-4 to store data in a selected partial super block according to the order.

For example, the operation controller 220 may control the plurality of memory devices 100-1 to 100-4 to store data in the first partial super block pSB1 selected as a first order according to the size of an index value. That is, the operation controller 220 may control the first memory device 100-1 to store data in the first partial block pBLK1 of the first memory device 100-1, which is included in the first partial super block pSB1, and control the second to fourth memory devices 100-2 to 100-4 such that memory devices not having the first partial block pBLK1 of the first memory device 100-1 do not store any data.

Also, the operation controller 220 may control the plurality of memory devices 100-1 to 100-4 to store data in the second partial super block pSB2 selected as a second order according to the size of an index value. Next, the operation controller 220 may control the plurality of memory devices 100-1 to 100-4 to store data in a partial super block selected as a next order according to the size of an index value. The same manner may be applied to a partial super block of a next order.

Figure 7B:
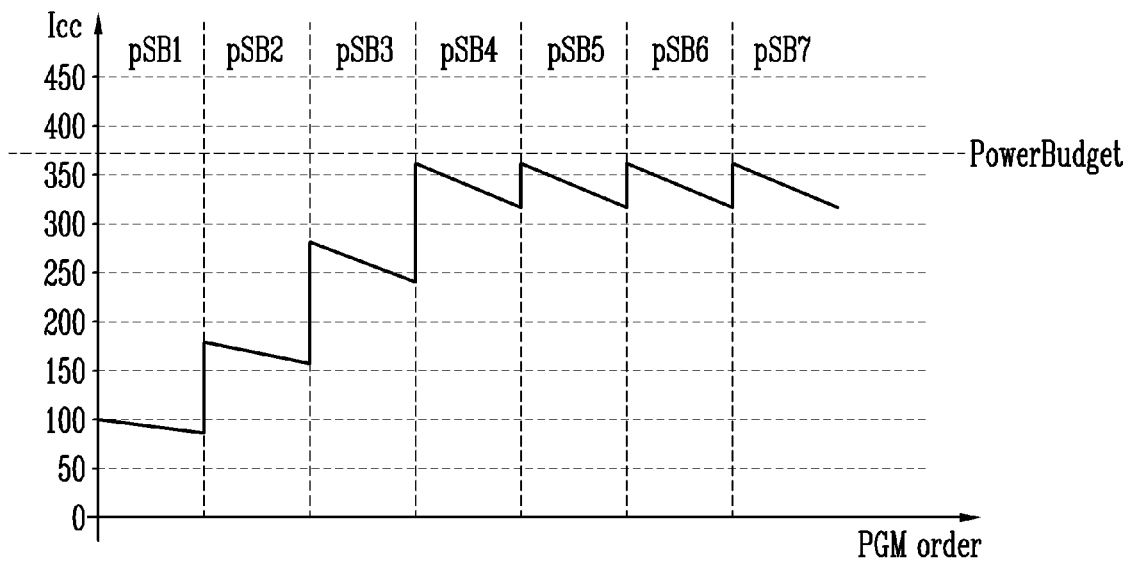
FIG. 7B is a diagram illustrating a consumption current according to a program operation using the partial super block shown in FIG. 7A in accordance with an embodiment of the present disclosure.

FIG. 7B is a diagram illustrating a consumption current according to a program operation using the partial super block shown in FIG. 7A in accordance with an embodiment of the present disclosure.

Referring to FIG. 7B, the x-axis of a graph represents that the first to fourth memory devices 100-1 to 100-4 perform a program operation in ascending order from the first partial super block pSB1 to the seventh partial super block pSB7. The y-axis of the graph represents consumption current Icc required when the first to fourth memory devices 100-1 to 100-4 perform, in parallel, the program operation. That is, the y-axis of the graph represents a sum of consumption currents with respect to the program operation, which are respectively required in individual memory devices 100-1 to 1004.

In the graph shown in FIG. 7B, a zone of each of the first to seventh partial super blocks pSB1 to pSB7 represents a zone in which the first to fourth memory devices 100-1 to 100-4 perform, in parallel, the program operation on a partial block in a corresponding partial super block.

Specifically, in the zone of the first partial super block pSB1, a memory device having a partial block in the first partial super block pSB1 among the first to fourth memory devices 100-1 to 100-4 may perform the program operation. For example, the partial block in the first partial super block pSB1 may include the first partial block pBLK1 of the first memory block of the first memory device 100-1.

The first memory device 100-1 may perform the program operation on the first partial block pBLK1 of the first memory block BLK1. In the graph shown in FIG. 7B, like the zone of the first partial super block pSB1, a total consumption current Icc may gradually decrease at a maximum value of consumption current required in the program operation of one memory device.

In the zone of the second partial super block pSB2, a memory device having a partial block in the second partial super block pSB2 among the first to fourth memory devices 100-1 to 100-4 may perform the program operation. For example, the partial block in the second partial super block pSB2 may include the second partial block pBLK2 of the first memory block BLK1 of the first memory device 100-1 and the first partial block pBLK1 of the first memory block BLK1 of the second memory device 100-2.

The first memory device 100-1 may perform the program operation on the second partial block pBLK2 of the first memory block BLK1. In parallel thereto, the second memory device 100-2 may perform the program operation on the first partial block pBLK1 of the first memory block BLK1. In the graph shown in FIG. 7B, like the zone of the second partial super block pSB2, a total consumption current Icc may gradually decrease at a value obtained by adding up a median value of consumption current required in the program operation of one memory device and a maximum value of consumption current required in the program operation of one memory device.

In the zone of the third partial super block pSB3, a memory device having a partial block in the third partial super block pSB3 among the first to fourth memory devices 100-1 to 100-4 may perform the program operation. For example, the partial block in the third partial super block pSB3 may include the first partial block pBLK1 of the second memory block BLK2 of the first memory device 100-1, the second partial block pBLK2 of the first memory block BLK1 of the second memory device 100-2, and the first partial block pBLK1 of the first memory block BLK1 of the third memory device 100-3.

The first memory device 100-1 may perform the program operation on the first partial block pBLK1 of the second memory block BLK2. In parallel thereto, the second memory device 100-2 may perform the program operation on the second partial block pBLK2 of the first memory block BLK1. In parallel thereto, the third memory device 100-3 may perform the program operation on the first partial block pBLK1 of the first memory block BLK1. In the graph shown in FIG. 7B, like the zone of the third partial super block pSB3, a total consumption current Icc may gradually decrease at a value obtained by adding up a maximum value of consumption current required in the program operation of one memory device, a median value of consumption current required in the program operation of one memory device, and a maximum value of consumption current required in the program operation of one memory device.

The same manner may be applied to a next zone.

In the zones of the fourth to seventh partial super blocks pSB4 to pSB7, numbers of physical pages having the erase state, which are included in memory blocks to which partial blocks in the fourth to seventh partial super blocks pSB4 to pSB7 belong, may be the same based on a time before the program operation on each of the fourth to seventh partial super blocks pSB4 to pSB7 is performed.

As described above, when the number of partial blocks in each partial super block gradually increase, the total consumption current Icc can stepwisely increase for each zone of the partial super blocks. In addition, a rapid increase in total consumption current Icc with respect to a super block can be prevented, in that when the program operation on a next partial super block is started, the total consumption current Icc is represented as a combination of a maximum value and median values of an individual consumption current.

In accordance with the present disclosure, there may be provided a storage device which performs a program operation or read operation by using partial super blocks including different numbers of partial blocks. Accordingly, a total consumption current Icc required in the program operation or read operation may be decreased. Further, the difference between a maximum value and an average value of the total consumption current Icc required in the program operation or read operation may be decreased.

Figure 8:
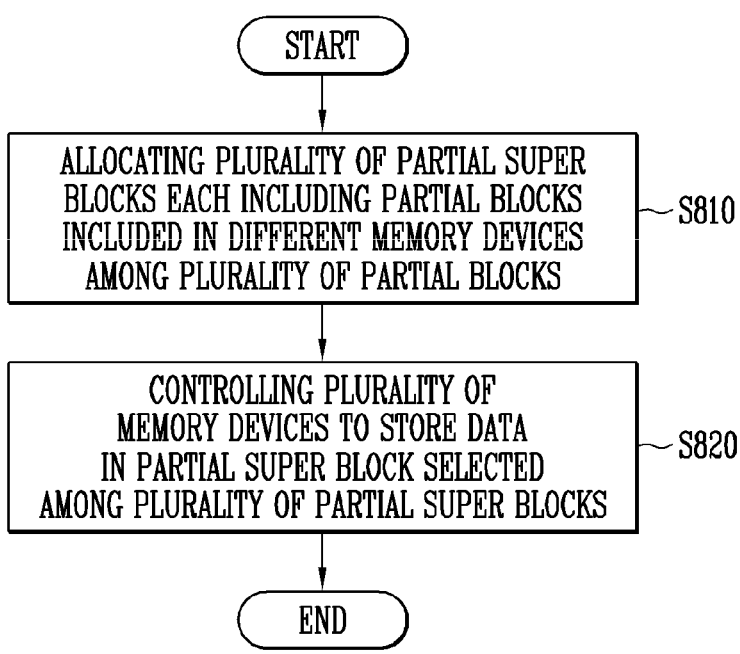
FIG. 8 is a diagram illustrating an operating method of a memory controller in accordance with an embodiment of the present disclosure.

FIG. 8 is a diagram illustrating an operating method of the memory controller 200 in accordance with an embodiment of the present disclosure.

Referring to FIG. 8, the operating method of the memory controller 200 may include operation S810 of allocating a plurality of partial super blocks pSB1 to pSB7 each including partial blocks in different memory devices among a plurality of partial blocks pBLK1 and pBLK2 and operation S820 of controlling a plurality of memory devices 100-1 to 100-4 to store data in a selected partial super block among the plurality of partial super blocks pSB1 to pSB7. The plurality of partial super blocks pSB1 to pSB7 may include different numbers of partial blocks.

Specifically, in the operating method of the memory controller 200, the memory controller 200 may allocate a plurality of partial super blocks pSB1 to pSB7 each including partial blocks in different memory devices among a plurality partial blocks pBLK1 and pBLK2.

In an embodiment, the plurality of partial super blocks pSB1 to pSB7 may include a first partial super block pSB1 and a second partial super block pSB2. The first partial super block pSB1 and the second partial super block pSB2 may include different numbers of partial blocks.

In an embodiment, a first partial block pBLK1 in the first partial super block pSB1 may be included together with a second partial block pBLK2 in the second partial super block pSB2 in the same memory block.

In an embodiment, the first partial super block pSB1 may include a partial block located in an upper region of a memory block of a first memory device 100-1 among the plurality of memory devices 100-1 to 100-4. The second partial super block pSB2 may include a partial block located in a lower region of the memory block of the first memory device 100-1 among the plurality of memory devices 100-1 to 100-4 and a partial block located in an upper region of a memory block of a second memory device 100-2 adjacent to the first memory device 100-1.

In an embodiment, in the operation of allocating the plurality of partial super blocks pSB1 to pSB7, the plurality of partial super blocks pSB1 to pSB7 each including partial blocks in different memory devices among the plurality of partial blocks pBLK1 and pBLK2 may be allocated based on a block table including an index value mapped to each of the plurality of partial super blocks pSB1 to pSB7 and information on at least one partial block mapped to each of the plurality of partial super blocks pSB1 to pSB7.

In an embodiment, the operation of allocating the plurality of partial super blocks pSB1 to pSB7 may include selecting a partial super block mapped to an index value and at least one partial block mapped to the partial super block in the block table, and allocating the selected partial super block to include the selected partial block.

In an embodiment, the operation of allocating the plurality of partial super blocks pSB1 to pSB7 may include selecting partial blocks in different memory devices among partial blocks and allocating a fifth partial super block pSB5 including the selected partial blocks such that a number of physical pages having the erase state, which are included in memory blocks to which the partial blocks in the fifth partial super block pSB5 belong, becomes equal to that of physical pages having the erase state, which are included in memory blocks to which the partial blocks in a fourth partial super block pSB4 belong.

In an embodiment, a number of partial blocks mapped to the first partial super block pSB1 in the block table may be less than that of partial blocks mapped to the second partial super block pSB2 to which an index value greater than that of the first partial super block pSB1 among the plurality of partial super blocks pSB1 to pSB7 is mapped.

In an embodiment, each of the plurality of partial blocks pBLK1 and pBLK2 may include the same number of physical pages.

In addition, the memory controller 200 may control the plurality of memory devices 100-1 to 100-4 to store data in a selected partial super block among the plurality of partial super blocks pSB1 to pSB7.

In an embodiment, the operation of controlling the plurality of memory devices 100-1 to 100-4 may include an operation of controlling the plurality of memory devices 100-1 to 100-4 to store data in a partial super block selected according to a size order of the index value among the plurality of partial super blocks pSB1 to pSB7 allocated based on the block table.

In an embodiment, the plurality of memory devices 100-1 to 100-4 may include different numbers of erased pages.

Figure 9:
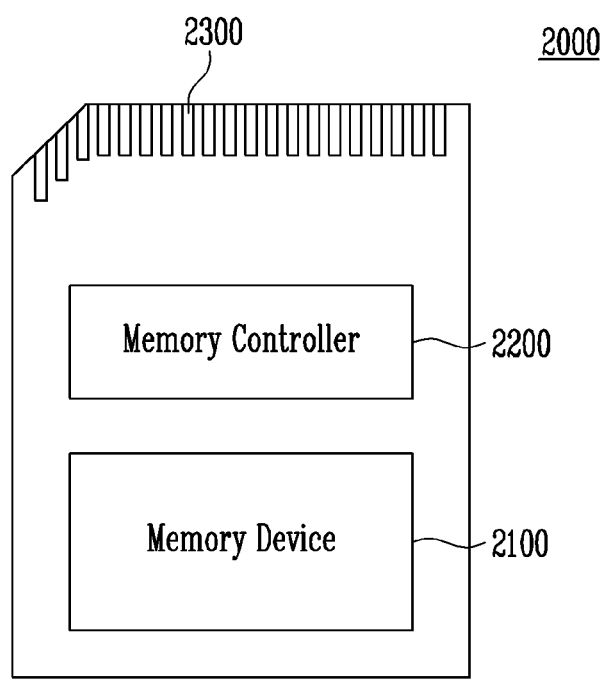
FIG. 9 is a block diagram illustrating a memory card system to which the storage device is applied in accordance with an embodiment of the present disclosure.

FIG. 9 is a block diagram illustrating a memory card system 2000 to which the storage device is applied in accordance with an embodiment of the present disclosure.

Referring to FIG. 9, the memory card system 2000 includes a memory device 2100, a memory controller 2200, and a connector 2300.

The memory device 2100 may perform a program operation of storing data. In some embodiments, the memory device 2100 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM). Descriptions of the memory device 100 described with reference to FIG. 1 may be equally applied to the memory device 2100. Hereinafter, overlapping descriptions will be omitted.

The memory controller 2200 may access the memory device 2100. For example, the memory controller 2200 may control read, program, and erase operations of the memory device 2100. The memory controller 2200 provides an interface between the memory device 2100 and a host. The memory controller 2200 drives firmware for controlling the memory device 2100. The memory controller 2200 may be implemented identically to the memory controller 200 described with reference to FIG. 1.

In some embodiments, the memory controller 2200 may include components such as a Random Access Memory (RAM), a processing unit, a host interface, a memory interface, and an error corrector.

The memory controller 2200 may communicate with an external device through the connector 2300. The memory controller 2200 may communicate with the external device (e.g., the host) according to a specific communication protocol. In some embodiments, the memory controller 2200 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. In some embodiments, the connector 2300 may be defined by at least one of the above-described various communication protocols.

The memory device 2100 and the memory controller 2200 may be integrated into a single semiconductor device, to constitute a memory card. For example, the memory controller 2200 and the memory device 2100 may constitute a memory card such as a PC card (Personal Computer Memory Card International Association (PCMCIA)), a Compact Flash (CF) card, a Smart Media Card (e.g., SM and SMC), a memory stick, a Multi-Media Card (e.g., MMC, RS-MMC, MMCmicro and eMMC), a secure digital (SD) card (e.g., SD, miniSD, microSD and SDHC), and a Universal Flash Storage (UFS).

Figure 10:
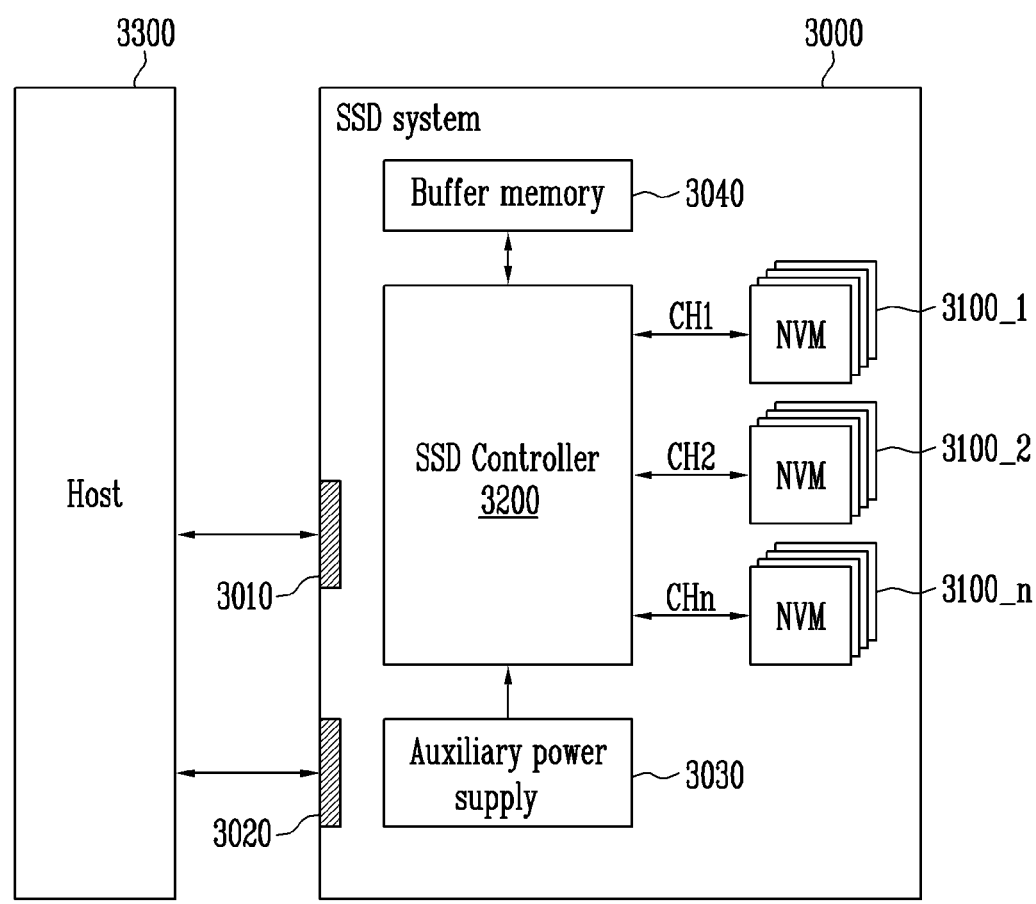
FIG. 10 is a block diagram illustrating a Solid State Drive (SSD) system to which the storage device is applied in accordance with an embodiment of the present disclosure.

FIG. 10 is a block diagram illustrating a Solid State Drive (SSD) system 3000 to which the storage device is applied in accordance with an embodiment of the present disclosure.

Referring to FIG. 10, the SSD system 3000 includes a plurality of flash memories 3100_1 to 3100_n, an SSD controller 3200, an auxiliary power supply 3030, and a buffer memory 3040.

The SSD system 3000 exchanges a signal with the host 3300 through a signal connector 3010, and receives power through a power connector 3020.

Each of the plurality of flash memories 3100_1 to 3100_n may perform a program operation of storing data. In some embodiments, each of the plurality of flash memories 3100_1 to 3100_n may be configured with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque Magnetic RAM (STT-MRAM). Descriptions of the memory device 100 described with reference to FIG. 1 may be equally applied to each of the plurality of flash memories 3100_1 to 3100_n. Hereinafter, overlapping descriptions will be omitted.

The SSD controller 3200 may control the plurality of flash memories 3100_1 to 3100_n in response to a signal received from the host 3300. In some embodiments, the signal may include signals based on an interface between the host 3300 and the SSD system 3000. For example, the signal may be a signal defined by at least one of communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe. In accordance with an embodiment of the present disclosure, the SSD controller 3200 may perform a function of the memory controller 200 described with reference to FIG. 1.

The auxiliary power supply 3030 may be connected to the host 3300 through the power connector 3020. The auxiliary power supply 3030 may receive power input from the host 3300, and charge the power. When the supply of power from the host 3300 is not smooth, the auxiliary power supply 3030 may provide power to the SSD system 3000. In some embodiments, the auxiliary power supply 3030 may be located in the SSD system 3000, or be located at the outside of the SSD system 3000. For example, the auxiliary power supply 3030 may be located on a main board, and provide auxiliary power to the SSD system 3000.

The buffer memory 3040 may operate as a buffer memory of the SSD system 3000. The buffer memory 3040 may temporarily store data received from the host 3300 or data received from the plurality of flash memories 3100_1 to

3100_n, or temporarily store meta data (e.g., a mapping table) of the flash memories 3100_1 to 3100_n. The buffer memory 3040 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 11:
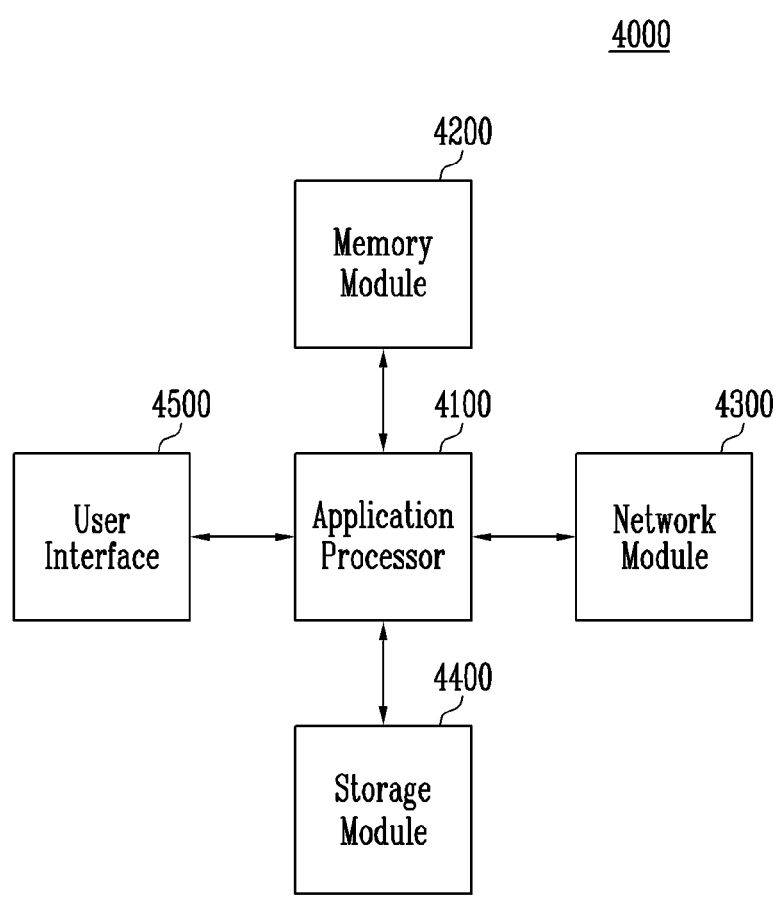
FIG. 11 is a block diagram illustrating a user system to which the storage device is applied in accordance with an embodiment of the present disclosure.

FIG. 11 is a block diagram illustrating a user system 4000 to which the storage device is applied in accordance with an embodiment of the present disclosure.

Referring to FIG. 11, the user system 4000 includes an application processor 4100, a memory module 4200, a network module 4300, a storage module 4400, and a user interface 4500.

The application processor 4100 may drive components included in the user system 4000, an operating system (OS), a user program, or the like. In some embodiments, the application processor 55D 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In some embodiments, the application processor 4100 and the memory module 4200 may be provided as one semiconductor package by being packaged based on a Package on Package (PoP).

The network module 4300 may communicate with external devices. In some embodiments, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In some embodiments, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In some embodiments, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In some embodiments, the storage module 4400 may be provided as a removable drive such as a memory card of the user system 4000 or an external drive.

In some embodiments, the storage module 4400 may include a plurality of nonvolatile memory devices, and the plurality of nonvolatile memory devices may operate identically to the memory device 100 described with reference to FIG. 1. The storage module 4400 may operate identically to the storage device 1000 described with reference to FIG. 1.

The user interface 4500 may include interfaces for inputting data or commands to the application processor 4100 or outputting data to an external device. In some embodiments, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

The methods, processes, and/or operations described herein may be performed by code or instructions to be executed by a computer, processor, controller, or other signal processing device. The computer, processor, controller, or other signal processing device may be those herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, managers, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with the present disclosure, there can be provided a storage device capable of decreasing a consumption current in program and read operations, and an operating method of the storage device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Moreover, embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory controller for controlling a plurality of memory devices each including a plurality of memory blocks, wherein each of the plurality of memory blocks includes a plurality of partial blocks, and each of the plurality of partial blocks includes a predetermined number of physical pages among a plurality of physical pages in one memory block, the memory controller comprising:
   a block manager configured to allocate a plurality of partial super blocks each including partial blocks in different memory blocks; and
   an operation controller configured to control the plurality of memory devices to perform, in parallel, a program operation of sequentially storing data in physical pages in each of the partial blocks in a partial super block selected from the plurality of partial super blocks,
   wherein each of the plurality of partial super blocks includes partial blocks in memory blocks having different numbers of physical pages having an erase state.

2. The memory controller of claim 1, wherein the plurality of partial super blocks include a first partial super block and a second partial super block, and
   wherein the first partial super block and the second partial super block include different numbers of partial blocks.

3. The memory controller of claim 2, wherein a first partial block in the first partial super block is included together with a second partial block in the second partial super block in the same memory block.

4. The memory controller of claim 2, wherein the first partial super block includes a partial block located in an upper region of a memory block selected in a first memory device among the plurality of memory devices, and
   wherein the second partial super block includes a partial block located in a lower region of the memory block selected in the first memory device among the plurality of memory devices and a partial block located in an upper region of a memory block selected in a second memory device adjacent to the first memory device.

5. The memory controller of claim 1, comprising a block table,
   wherein the block table includes an index value mapped to each of the plurality of partial super blocks and information on at least one partial block mapped to the plurality of partial super blocks.

6. The memory controller of claim 5, wherein the block manager selects a partial super block mapped to the index value and at least one partial block mapped to the partial super block in the block table, and allocates the selected partial super block to include the selected partial block.

7. The memory controller of claim 5, wherein the operation controller controls the plurality of memory devices to store data in a partial super block selected according to a size order of the index value among the plurality of partial super blocks allocated based on the block table.

8. The memory controller of claim 5, wherein a number of partial blocks mapped to a first partial super block in the block table is less than that of partial blocks mapped to a second partial super block to which an index value greater than that of the first partial super block is mapped.

9. The memory controller of claim 1, wherein the plurality of partial super blocks include a first partial super block and a second partial super block, and
   wherein the block manager selects partial blocks in different memory devices and allocates the second partial super block including the selected partial blocks such that a number of physical pages having the erase state, which are included in memory blocks to which the partial blocks in the second partial super block belong, becomes equal to that of physical pages having the erase state, which are included in memory blocks to which the partial blocks in the first partial super block belong.

10. The memory controller of claim 1, wherein each of the plurality of partial blocks includes the same number of physical pages.

11. A method for operating a memory controller for controlling a plurality of memory devices each including a plurality of memory blocks, wherein each of the plurality of memory blocks includes a plurality of partial blocks, and each of the plurality of partial blocks includes a predetermined number of physical pages among a plurality of physical pages in one memory block, the method comprising:
    allocating a plurality of partial super blocks each including partial blocks in different memory blocks; and
    controlling the plurality of memory devices to perform, in parallel, a program operation of sequentially storing data in physical pages in each of partial blocks in a partial super block selected from the plurality of partial super blocks,
    wherein each of the plurality of partial super blocks includes partial blocks in memory blocks having different numbers of physical pages having an erase state.

12. The method of claim 11, wherein the plurality of partial super blocks include a first partial super block and a second partial super block, and
    wherein the first partial super block and the second partial super block include different numbers of partial blocks.

13. The method of claim 12, wherein a first partial block in the first partial super block is included together with a second partial block in the second partial super block in the same memory block.

14. The method of claim 12, wherein the first partial super block includes a partial block located in an upper region of a memory block selected in a first memory device among the plurality of memory devices, and
    wherein the second partial super block includes a partial block located in a lower region of the memory block selected in the first memory device among the plurality of memory devices and a partial block located in an upper region of a memory block selected in a second memory device adjacent to the first memory device.

15. The method of claim 11, wherein the allocating of the plurality of partial super blocks includes allocating the plurality of partial super blocks each including partial blocks in different memory devices among the plurality of partial blocks based on a block table including an index value mapped to each of the plurality of partial super blocks and information on at least one partial block mapped to the plurality of partial super blocks.

16. The method of claim 15, wherein the allocating of the plurality of partial super blocks includes selecting a partial super block mapped to the index value and at least one partial block mapped to the partial super block in the block table, and allocating the selected partial super block to include the selected partial block.

17. The method of claim 15, wherein the controlling of the plurality of memory devices includes controlling the plurality of memory devices to store data in a partial super block selected according to a size order of the index value among the plurality of partial super blocks allocated based on the block table.

18. The method of claim 15, wherein a number of partial blocks mapped to a first partial super block in the block table is less than that of partial blocks mapped to a second partial super block to which an index value greater than that of the first partial super block is mapped.

19. The method of claim 11, wherein the plurality of partial super blocks include a first partial super block and a second partial block, and
wherein the allocating of the plurality of partial super blocks includes selecting partial blocks in different memory devices and allocating the second partial super block including the selected partial blocks such that a number of physical pages having the erase state, which are included in memory blocks to which the partial blocks in the second partial super block belong, becomes equal to that of physical pages having the erase state, which are included in memory blocks to which the partial blocks in the first partial super block belong.

20. A system comprising:
a plurality of memory devices, each memory device including a plurality of memory blocks; and
a memory controller configured to:
divide each memory block into a plurality of partial blocks, each partial block including a set number of physical pages among a plurality of physical pages in one memory block;
allocate a plurality of partial super blocks including a first partial super block and a second partial super block, each partial super block including one or more partial blocks selected from the plurality of memory devices, the number of partial blocks in the first partial super block being different from that of the second partial super block; and
control the plurality of memory devices to sequentially perform a program operation on the plurality of partial super blocks.

* * * * *